United States Patent [19]

White et al.

[11] 3,890,107

[45] June 17, 1975

[54] MATERIALS USEFUL FOR PROSTHETIC DEVICES AND THE LIKE

[75] Inventors: Eugene W. White; Jon N. Weber, both of State College, Pa.; Rodney A. White, Syracuse, N.Y.

[73] Assignee: Research Corporation, New York, N.Y.

[22] Filed: Sept. 25, 1972

[21] Appl. No.: 291,547

[52] U.S. Cl.............. 29/183; 29/180 R; 128/92 C; 161/20; 260/2.5 R
[51] Int. Cl................................................. B27f 5/00
[58] Field of Search ............ 156/58, 59; 264/44.49, 264/222, 227,221, 226; 32/10 A; 128/92 C, 92 CA; 161/20, 19; 55/526; 210/499; 252/426, 477; 106/40 R; 260/2.5 R; 29/183, 18 DR; 3/1

[56] References Cited
UNITED STATES PATENTS

| | | | |
|---|---|---|---|
| 2,201,131 | 5/1940 | Jungersen | 164/7 |
| 2,490,193 | 12/1949 | Barr | 164/7 |
| 2,860,175 | 11/1958 | Justi | 136/120 FC |
| 3,116,170 | 12/1963 | Williams et al. | 136/120 FC X |
| 3,201,282 | 8/1965 | Justi et al. | 136/120 FC X |
| 3,201,858 | 8/1965 | Valyi | 136/120 FC X |
| 3,215,563 | 11/1965 | Clemm | 136/120 FC X |
| 3,236,693 | 2/1966 | Caesar | 136/120 FC X |
| 3,242,011 | 3/1966 | Witherspoon | 136/120 FC |

*Primary Examiner*—L. Dewayne Rutledge
*Assistant Examiner*—O. F. Crutchfield
*Attorney, Agent, or Firm*—Cooper, Dunham, Clark, Griffin & Moran

[57] ABSTRACT

A material useful as a biomaterial for the manufacture of prosthetic devices and the like is provided by a synthetic material characterized by having the microstructure corresponding to the microstructure of porous carbonate skeletal material of marine life, such as marine invertebrate skeletal material, e.g. echinoid spine calcite and Porites skeletal aragonite. Such synthetic materials are prepared by producing a replicate in negative or positive form of the microstructure of the aforesaid porous carbonate skeletal material.

19 Claims, No Drawings

MATERIALS USEFUL FOR PROSTHETIC DEVICES AND THE LIKE

This invention relates to the production of synthetic materials having a special microstructure. More particularly this invention relates to synthetic materials and the production thereof useful as biomaterials, such as for the manufacture of prosthetic devices, bone implants and the like.

The replacement of damaged body tissue and bone with foreign or synthetic materials has long been an appealing possibility. Sterilized animal bone has not been satisfactory because of problems with residual organic matter which elicits immunological reactions. Another approach to the repair or replacement of fractured bone or damaged joints has been to fabricate prosthetic implants from materials compatible with body tissue and having acceptable mechanical properties. Screws, pins, nails and other items or shapes fashioned from highly polished alloys, such as Vitallium, a cobalt-chromium alloy having the approximate composition 65% Co, 35% Cr and 5% Mo, have been widely used but these implants often cause inflammation and excessive development of fibrous tissue. Corrosion of the metal and inability to induce long term mechanical attachment are further disadvantages. Attempts to increase the degree of tissue attachment by sintering a layer of metal spheres to the outer surface, such as to the outer surface of a Vitallium alloy implant, have been made. Sintered titanium fiber deposits have also been employed. Other potential prosthetic materials include phosphate-containing recrystallized glasses, phosphate-bonded alumina and porous ceramics. The difficulties in controlling pore size, and more important, in controlling the size of the connections between adjacent pores have been major limitations in the production and use of porous ceramics as prosthetic materials. The patent literature describes many materials, and modes of preparation of such materials, proposed for the manufacture of prosthetic devices and anatomical replacements, see for example, U.S. Pat. Nos. 2,688,139, 3,314,420, 3,400,719, 3,526,005, 3,526,906, 3,563,925 and 3,605,123. The disclosures of these patents are herein incorporated and made part of this disclosure.

Studies of implant or prosthetic materials have indicated the pore connections between 100 and 200 $\mu$m (microns) are necessary for the development of Haversian systems and the anastomosing blood supply which is essential for bone nourishment. Optimum pore size for the ingrowth of osteoid cells and fibrous tissue are 40–100 $\mu$m and 5–15 $\mu$m, respectively. Although uniform pore size and permeability are difficult to obtain in synthetic materials, materials which possess a uniform pore size and permeability are fairly common in nature. For example, most echinoderm skeletons are characterized by a pronounced three-dimensional fenestrate structure, see SCIENCE, 166, 1147 (1969). The disclosures of this article are herein incorporated and made part of this disclosure. This article describes the microstructure of echinoderm skeletons which, as indicated hereinabove, are characterized by a pronounced three-dimensional fenestrate structure providing a periodic minimal surface. Such a surface divides space into two interpenetrating regions, each of which is a single multiply connected domain. According to this article the surface which is the interface between the solid calcite phase and the organic matter component provides maximum contact for crystal growth. The described microstructure appears to be unique to echinoderm skeletal materials.

Other porous skeletal materials of marine invertebrate life and investigations of such materials indicate that a considerable variety of microstructures might serve as the basis for the production of synthetic implant materials by structural replication. Of these other porous skeletal materials the most promising is the common scleractinian, reef-building colonial coral Porites whose skeleton is constructed of radiating clusters of acicular aragonite crystals (sclerodermites). The small (less than 2 mm) corallites, which are closely united without coenosteum, have both perforate skeletal walls and septa with perforations.

Examination of the microstructures of echinoid spine calcite, Porites skeletal aragonite and human bone indicated that except for a greater degree of orientation of the pores in the echinoid spine calcite and the Porites skeletal aragonite, the gross microstructural features of these three materials are similar. In human bone the pore volume ranges from about 90% in regions of low calcification to as low as 10% in the most heavily calcified areas. It would appear possible, therefore, to select in the animal kingdom a microstructure substantially corresponding to that of the microstructure of human bone. The disadvantages, however, of using naturally occurring skeletal materials directly as bone implants or bone replacements and other prosthetic devices, however, are the low strength and high solubility of the carbonate material, such as calcite and aragonite, which make up the bulk of the aforesaid marine skeletal materials. In the case of the hydroxyapatite of human bone and vertebrates the difficulty and disadvantages reside in the removal therefrom of residual organic matter which elicits adverse immunological reactions.

Accordingly, it is an object of this invention to provide synthetic materials useful as biomaterials, such as for the manufacture of prosthetic devices and the like.

It is another object of this invention to provide a synthetic material having a microstructure substantially corresponding to the microstructure of human bone and the like.

It is yet another object of this invention to provide a synthetic material especially useful as a human bone implant.

Still another object of this invention is to provide a process for the manufacture of synthetic biomaterials, such as a synthetic material having the microstructure resembling that of human bone and the like.

How these and other objects of this invention are achieved will become apparent in the light of the accompanying disclosure. In at least one embodiment of the practice of this invention at least one of the foregoing objects will be achieved.

The microstructure of the porous, permeable animal skeletal material, such as the porous, permeable carbonate skeletal material of marine life, such as the porous carbonate skeletal material of marine invertebrates, e.g. echinoid spine calcite and Porites skeletal aragonite, has been precisely copied or replicated, in negative and positive form, in synthetic materials, such as plastic and metal and alumina. These synthetic materials would be useful for the manufacture of prosthetic devices, such as body and bone implants and the like.

Because of the porosity and permeability of such synthetic materials these materials would also be useful for the fabrication of special filters, catalyst supports, means for the immobilization and/or stabilization of catalytic agents, including enzymes, for carrying out specific chemical reactions, or for the manufacture of mufflers and other devices or structures useful to remove pollutants and the like from gaseous streams, such as the exhaust gas from automobile internal combustion engines, passing therethrough.

Various techniques, procedures and materials may be employed in the process for the preparation of the special synthetic materials in accordance with this invention. Generally, as a first step, the organic matter contained in the natural source material, such as echinoid spine calcite or Porites skeletal aragonite, is removed, such as by immersion in a dilute (5%) aqueous solution of sodium hypochlorite. Usually, an immersion time of about 30 hours is satisfactory for the removal of most of the organic matter. Following this oxidation of the soft tissue and organic matter the material is rinsed, preferably in deionized water, and dried, such as at about 90°C. See also the technique for the removal of organic matter from animal bone as described in SCIENCE, 119, 771 (1954) which might also be employed. If desired, the material to be replicated, if not already shaped, is then shaped into a desired form or structure. If the material whose microstructure is to be replicated is echinoderm calcite or scleractinian coral aragonite it can be readily shaped by machining into a desired form, such as cylinders, screws, nuts, bolts, pins and the like.

For methacrylate replicas, negative methacrylate copies of the structure or shape are obtained by vacuum impregnation with and subsequent in situ solidification of the impregnating methacrylate, followed by removal of the original structural material, i.e. the carbonate skeletal material, such as the calcite or aragonite, by leaching with dilute aqueous hydrochloric acid, such as 5–20% HCl. To provide positive copies, the material whose microstructure is to be replicated is first vacuum impregnated with wax, the original material then removed, such as by leaching with dilute aqueous hydrochloric acid, and the resulting wax negative then vacuum impregnated with methacrylate. The impregnating methacrylate is then solidified in situ and the wax negative removed by melting.

Synthetic materials, such as the replicas of porous carbonate skeletal materials of marine life, are also obtainable in metal form, such as in the metal alloys Vitallium and Tichonium in accordance with this invention. With respect to the production of Tichonium alloy replicas, the porous carbonate skeletal material, such as the echinoderm skeletal material or coral skeletal material, is first vacuum impregnated with wax and the calcite or aragonite skeletal material removed with dilute aqueous hydrochloric acid. The resulting wax negative is then vacuum impregnated with a refractory material, such as Kerr Cristobalite Investment, manufactured by Kerr Manufacturing Co., Romulus, Michigan, and the metal is cast therein using standard centrifugal casting techniques. The result is an exact negative reproduction or replicate of the original material in metal. For the replication of a large amount of material vacuum casting would appear to be preferable.

Positive reproductions in metal require the manipulation of the intermediate copies so that the sample invested with Kerr Cristobalite is a wax positive. Kerr Ivory Inlay Casting also manufactured by Kerr Manufacturing Co. was employed in these preparations to assure complete removal of the wax and to preserve detail in the resulting replications. Sintered alumina copies are prepared by vacuum impregnating the wax negative with a thixotropic slurry of about 5 $\mu$m particle size alpha alumina. The alpha alumina slurry is rendered liquid by vibratory action to facilitate the filling of the pores of the wax negative. After burn-off of the wax at 400°C. the alumina is sintered at a temperature of about 1,650°C. in air.

Copies of the microstructure of the porous carbonate skeletal material of Porites skeletal aragonite have been obtained in polymerized methacrylate, tin, the alloy Tichonium and alpha alumina.

The applicability of the practices of this invention for the production of synthetic materials useful as biomaterials, such as bone implants and the like, is great. The special geometric characteristics of particular natural microstructures which are difficult or impossible to duplicate artificially can be replicated in synthetic materials, such as metals or alumina or the like. This is accomplished in accordance with the practice of this invention by converting the natural source material into a synthetic material having the physical, chemical and mechanical properties necessary for the desired application. Structures made up of a special combination of synthetic materials can be produced in accordance with the practices of this invention. For example, artificial limbs might be permanently attached by means of an implant device embodying the practices of this invention and consisting of a central Vitallium rod (for strength) coated with porous ceramic material (alpha alumina) for firm attachment to living tissue.

Numerous synthetic materials may be employed for the preparation of the special biomaterials in accordance with this invention characterized by having the microstructure corresponding to the desired microstructure found in nature. Depending upon the requirements, polymeric materials, metal or ceramics and mixtures thereof may be employed in the preparation of the desired synthetic materials in accordance with this invention. For use as an implant the synthetic materials making up the implant prepared in accordance with this invention would be selected on the bases of histotoxicity, resistance to biodegradation, mechanical strength, wear resistance, fatigue resistance, tissue fixation, sterilizability and the like, including thrombogenicity. Materials which are usefully employed in the preparation of the synthetic materials having the special microstructures in accordance with this invention include 316L stainless steel, chrome-cobalt alloys, such as Vitallium, Tichonium, gold, silver, platinum, tin, tantalum, titanium, anti-thrombogenic carbonaceous material, such as the so-called glassy carbon, ceramic materials, such as alumina, polymerized methacrylate, high density polyethylene, polypropylene, silastic and the like.

The natural materials whose porous, permeable structure can be replicated to produce the desired biomaterials in accordance with the practices of this invention are vast. Of special interest because of their special microstructure are the porous carbonate skeletal materials of marine life, particularly marine invertebrate skeletal material, such as echinoid spine calcite and Porites skeletal aragonite. Of the scleractinian coral the genus Porites is especially useful as providing a source of natural material whose skeletal microstructure can be usefully replicated to produce the synthetic biomaterial of this invention. Porites coral is one of the most successful of the reef-building corals and has a worldwide distribution in the coral reef zone. The colonies grow rapidly with massive forms often exceeding a meter in diameter, thereby providing a large amount of material suitable for replication into substantially any desired and useful shape for prosthetic purposes.

Some of the marine animals which provide suitable source materials are the Echinodermata, particularly the *Heterocentrotus trigonarius* and *Heterocentrotus mammillatus*, which are Indo-Pacific, shallow water, tropical echinoids providing large spines. Other marine life which provide porous carbonate skeletal materials especially useful for the preparation of synthetic materials in accordance with this invention include the Scleractinian corals, such as Porites spp. which are numerous and exist in large size colonies and in great abundance, also the *Goniopora* sp., the *Alvepora* sp. which have a pore size greater than that of Porites but a permeability substantially the same as Porites, the *Astreopora* sp. which have a pore size greater than that of Porites.

In the processing of these materials the marine life, such as the *Heterocentrotus* and the Porites and other corals, are removed from the reef and the organic matter therein preserved for later removal or the organic material may be removed upon capture from the reef. The organic material may be preserved by immersion of the material in about 10–40% formaldehyde for a period of 15–45 minutes or the organic material may be at least partially removed by immersion in 5% aqueous sodium hypochlorite solution or commercial bleach for a suitable period of time, such as from 30 minutes to 3 hours or more.

After removal of the organic material the source material may be shaped into a desired form, such as on a lather or by means of a band saw and drill. Desirably, after shaping or forming into a desired geometric form the source material is again immersed in a 5% sodium hypochlorite solution for about 24 hours at about room temperature (20°C.) to remove all of any remaining soft organic tissue. The thus-treated source material is then rinsed with distilled water to remove all decomposition products and residual hypochlorite so that only the skeletal material calcium carbonate remains. The source material is then dried in an oven at about 90°C. for about 4 hours.

The following example describes the preparation of methacrylate negative copies of the aforesaid natural source materials.

EXAMPLE NO. 1

Spherical granules of polymerized methacrylate were admixed with a solvent with stirring to produce a free-flowing liquid polymethacrylate mix. The organic-free source material, such as Porites skeletal aragonite or echinoid spine calcite, is then immersed in the polymethacrylate mix and subjected to a vacuum. The vacuum is then broken and the polymethacrylate impregnated material is removed and allowed to harden, about 5 minutes being required, or until the impregnating polymethacrylate has set to a gel-like consistency. Excess polymethacrylate is removed and the impregnated piece permitted to harden for another period of time, about 1 hour. The surface of the impregnated piece is then lightly sanded to remove remaining excess polymethacrylate and to expose the carbonate skeletal structure on the surfaces. The impregnated piece is then treated to remove the carbonate skeletal material by immersing the piece in a 10% aqueous hydrochloric acid solution. Depending upon the dimensions of the piece the removal of the carbonate material is usually complete within about 8–10 hours, more or less. When the removal of the carbonate skeletal material is complete, the piece is removed and rinsed in distilled water and dried, such as at about 60°C. There is produced an exact negative methacrylate copy of the thus-treated source material.

The following example describes the preparation of an alumina positive copy of the aforesaid natural source materials, such as source materials mentioned in Example No. 1.

EXAMPLE NO. 2

As in Example No. 1, the source material is vacuum impregnated, this time with wax. The wax impregnated piece is then trimmed to remove excess wax and to expose the exterior surface of the carbonate skeletal structure. The carbonate skeletal structure is then removed by immersion in dilute aqueous hydrochloric acid, such as in Example No. 1. After rinsing and drying the wax negative is then vacuum impregnated with a thixotropic alumina slurry, the alumina particle size being sufficiently small that the alumina readily enters and moves along the pores of the piece, e.g. the wax negative. Preferably the piece is subjected to vibratory motion so as to render the alumina slurry fluid during impregnation. Linde A alumina, a commercially available alumina, preferably pre-treated by soaking in concentrated HCl for 48 hours and then washed completely with deionized water and the water decanted, has been found to be especially useful as the alumina material for impregnating the wax negative. After the impregnation of the wax negative with the alumina has been completed excess alumina is removed. The thus-treated piece is slowly heated in an air atmosphere from room temperature to about 800°C. over about an 8 hour period. This heating or slow firing burns off the wax and imparts some strength to the alumina. The substantially wax-free alumina replica is then fired at an elevated temperature, such as a temperature in the range from about 1400°–1450°C. to as high as 1600°–1650°C. for a period of time ranging from about 4 days to about 3 hours, respectively, depending upon the temperature. Since some shrinkage of the alumina occurs during firing this shrinkage must be taken into account if an exact positive replica of the piece is desired. By following the practices of this example there is produced an alumina positive copy or replica of the porous permeable source material.

The following example describes the preparation of a metal alloy copy of the aforementioned natural source materials.

EXAMPLE NO. 3

As in Example No. 2, a wax negative of the source material is obtained by vacuum impregnation. The wax negative is then vacuum impregnated with a casting investment, such as Cristobalite, manufactured by Kerr Manufacturing Co., or equivalent material. The wax is then burned off or otherwise removed from the impregnated negative, such as by firing from room temperature to about 1,350°F. over a period of time, such as about 8 hours. Upon completion of the wax removal and firing, molten metal is then cast, such as by centrifugal casting, into the piece and upon completion of the casting operation the resulting cast piece is immersed in a pan of water. The thermal shock and action of the resulting generated steam breaks down the investment which is then substantially completely removed in a subsequent vibratory scrubbing operation.

As is evident from the descriptions set forth in the accompanying disclosure and examples, by following the disclosed techniques negative and positive copies of the special naturally occurring porous and the permeable materials can be produced. Once a durable copy or replica, a negative or positive, is produced such a copy can be employed to produce another copy or replica. Additionally, these copies may be employed to produce special replicas wherein, for example, a metal negative replica can be impregnated or filled with a different material, such as a ceramic or plastic material or cermet, such that there is produced a special material, although no longer porous, which possesses unusual physical, chemical and electrical characteristics. Additionally, both negative and positive copies of the natural porous and permeable materials may be provided with surface coatings, such as a coating of catalytic material which further imparts special physical, chemical and/or electrical properties to the resulting material.

As will be apparent to those skilled in the art in the light of the foregoing disclosure, many modifications, alterations and substitutions are possible in the practice of this invention without departing from the spirit or scope thereof.

We claim:

1. A substantially uniform permeable microporous synthetic material useful as a biomaterial, such as for the manufacture of prosthetic devices, characterized by a substantially uniform pore volume in the range from about 10 to about 90% and having a microstructure characterized by a pronounced three-dimensional fenestrate structure corresponding to the microstructure of the porous carbonate echinoderm or scleractinian coral skeletal material of marine life and providing a periodic minimal surface, said periodic minimal surface dividing the volume of said material into two interpenetrating regions, each of which is a single, multiply connected domain, said material having a substantially uniform pore size diameter and substantially uniform pore connections or openings in the range from about 5 microns to about 500 microns.

2. A synthetic material in accordance with claim 1 wherein the synthetic material is a metal alloy.

3. A synthetic material in accordance with claim 2 wherein said alloy is an alloy comprising about 65% cobalt, about 35% chromium and about 5% molybdenum.

4. A synthetic material in accordance with claim 1 wherein the synthetic material is a polymerized methacrylate.

5. A synthetic material in accordance with claim 1 wherein said synthetic material is tin.

6. A synthetic material in accordance with claim 1 wherein said synthetic material is gold.

7. A synthetic material in accordance with claim 1 wherein said synthetic material is silver.

8. A synthetic material in accordance with claim 1 wherein said synthetic material is platinum.

9. A synthetic material in accordance with claim 1 wherein said synthetic material is tantalum.

10. A synthetic material in accordance with claim 1 wherein said synthetic material is a titanium alloy.

11. A synthetic material in accordance with claim 1 wherein said synthetic material is 316L stainless steel.

12. A synthetic material in accordance with claim 1 wherein said synthetic material is alpha alumina.

13. A synthetic material in accordance with claim 1 wherein said synthetic material is a ceramic.

14. A synthetic material in accordance with claim 1 wherein said synthetic material is a cermet.

15. A synthetic material in accordance with claim 1 wherein said synthetic material is an anti-thrombogenic carbonaceous material.

16. A synthetic material in accordance with claim 1 having the ratio of pore volume to the volume of the solid of approximately 1 and having cross-sectional diameters of both the pore and the solid phases of about the same dimension, ranging from about 5 microns to about 500 microns.

17. A synthetic material in accordance with claim 1 having a pore size diameter in the range about 40–100 microns.

18. A synthetic material in accordance with claim 1 having a pore size diameter in the range about 5–15 microns.

19. A microporous synthetic material in accordance with claim 1 wherein said material has pore connections in the range from about 100 to about 200 microns.

* * * * *

UNITED STATES PATENT AND TRADEMARK OFFICE
CERTIFICATE OF CORRECTION

PATENT NO. : 3,890,107

DATED : June 17, 1975

INVENTOR(S) : Eugene W. White, Jon N. Weber and Rodney A. White

It is certified that error appears in the above-identified patent and that said Letters Patent are hereby corrected as shown below:

Title Page, under References Cited, the following Should be added:

| U.S. Patents | 996,783 | 7/1911 | Moreau |
|---|---|---|---|
| | 1,020,679 | 3/1912 | Barrows |
| | 2,129,304 | 9/1938 | Feinbloom |
| | 2,688,139 | 9/1954 | Jardon |
| | 3,102,337 | 9/1963 | Mintz |
| | 3,605,123 | 9/1971 | Hahn |
| | 3,512,184 | 5/1970 | Grove | and the publication reference,

Donnay & Pawson "X-ray Diffraction Studies of Echinoderm Plates", SCIENCE, Vol. 166, No. 3909, pp. 1147-1152.

Signed and Sealed this eleventh Day of November 1975

[SEAL]

Attest:

RUTH C MASON
Attesting Officer

C MARSHALL DANN
Commissioner of Patents and Trademarks